US012129693B2

(12) United States Patent
Schiffer

(10) Patent No.: US 12,129,693 B2
(45) Date of Patent: Oct. 29, 2024

(54) LOCKING DEVICE FOR A MOTOR VEHICLE BONNET

(71) Applicant: Kiekert AG, Heiligenhaus (DE)

(72) Inventor: Holger Schiffer, Meerbusch (DE)

(73) Assignee: Kiekert AG, Heiligenhaus (DE)

( * ) Notice: Subject to any disclaimer, the term of this patent is extended or adjusted under 35 U.S.C. 154(b) by 190 days.

(21) Appl. No.: 16/094,483

(22) PCT Filed: Mar. 22, 2017

(86) PCT No.: PCT/DE2017/100231
§ 371 (c)(1),
(2) Date: Jan. 17, 2019

(87) PCT Pub. No.: WO2017/182022
PCT Pub. Date: Oct. 26, 2017

(65) Prior Publication Data

US 2024/0035320 A1 Feb. 1, 2024

(30) Foreign Application Priority Data

Apr. 18, 2016 (DE) .................... 10 2016 107 129.3

(51) Int. Cl.
*E05B 85/24* (2014.01)
*E05B 77/08* (2014.01)
*E05B 83/24* (2014.01)

(52) U.S. Cl.
CPC .......... *E05B 85/243* (2013.01); *E05B 83/243* (2013.01); *E05B 77/08* (2013.01)

(58) Field of Classification Search
CPC ...... E05B 77/08; E05B 83/243; E05B 85/243; E05B 83/24

(Continued)

(56) References Cited

U.S. PATENT DOCUMENTS

2012/0161456 A1* 6/2012 Riedmayr ............... E05B 83/24 292/226
2014/0015258 A1* 1/2014 Barczynski ............. E05B 77/08 292/100

(Continued)

FOREIGN PATENT DOCUMENTS

DE 3337202 C2 * 7/1991
DE 10318796 A1 * 7/2004 ............. E05B 77/08

(Continued)

OTHER PUBLICATIONS

Espacenet machine translation of DE 102007007622 A1, generated Mar. 26, 2024. (Year: 2024).*

(Continued)

*Primary Examiner* — Kristina R Fulton
*Assistant Examiner* — Emily G. Brown
(74) *Attorney, Agent, or Firm* — Renner, Otto, Boisselle & Sklar, LLP

(57) ABSTRACT

A locking device for a motor vehicle bonnet, wherein the locking device comprises a locking mechanism with a rotary latch and a pawl for locking the rotary latch in a main latching position. Said locking device also comprises a catch hook which can define an opening movement of a lock retainer in a secure position which is between an intended closed position and an intended open position after opening the locking mechanism, wherein the catch hook comprises a load dependent barrier, and the locking device is designed such that a locking movement of the lock retainer is defined by the barrier in the intended closed position such that the lock retainer only goes in further than the intended closed position when there is an overload. A further developed locking device with pedestrian protection can also be provided.

18 Claims, 3 Drawing Sheets

Figure 1:
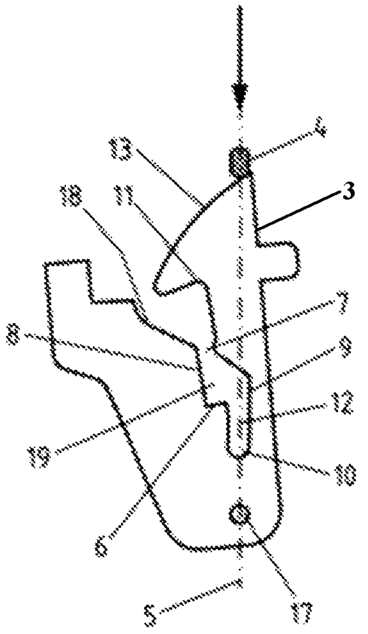

(58) Field of Classification Search
USPC ............................ 292/100, DIG. 22, DIG. 14
See application file for complete search history.

(56) References Cited

U.S. PATENT DOCUMENTS

| | | | | |
|---|---|---|---|---|
| 2015/0145263 | A1* | 5/2015 | Farris ...................... | E05B 83/24 292/195 |
| 2017/0167168 | A1* | 6/2017 | Yu ........................... | E05B 77/54 |

FOREIGN PATENT DOCUMENTS

| | | | | | |
|---|---|---|---|---|---|
| DE | 102007007622 | A1 * | 9/2007 | ............. | E05B 83/24 |
| DE | 102007007633 | A1 * | 8/2008 | ............. | B60R 21/34 |
| DE | 102008039731 | | 3/2010 | | |
| DE | 112012000578 | | 11/2013 | | |
| DE | 102013113588 | A1 * | 9/2014 | ............. | E05B 83/24 |
| EP | 1172507 | | 8/2005 | | |
| FR | 2863298 | | 6/2005 | | |
| FR | 2889230 | | 2/2007 | | |
| FR | 2897380 | A1 * | 8/2007 | ............. | E05B 83/24 |
| KR | 20130019686 | | 2/2013 | | |

OTHER PUBLICATIONS

Espacenet machine translation of DE 10318796 A1, generated Mar. 28, 2024. (Year: 2024).*
International Search Report and Written Opinion for corresponding Patent Application No. PCT/DE2017/100231 dated Jul. 14, 2017.

* cited by examiner

LOCKING DEVICE FOR A MOTOR VEHICLE BONNET

The invention relates to a locking device for a motor vehicle bonnet according to the generic term of the main claim.

Personal accidents between a motor vehicle and a pedestrian generally cause severe injuries to the pedestrian, in particular when the pedestrian impacts the motor bonnet. In the case of such an accident, even slight yielding of the motor bonnet during the pedestrian's impact can reduce the severity of injuries.

Solutions are therefore already known which enable such yielding of the motor bonnet. The publications EP1172507B1, DE102008039731A1 and KR20130019686A disclose motor bonnet locks and motor bonnet bolts with pedestrian impact protection. On KR20130019686A, a securing hook 200 has a curved surface 240 which, during closure of the motor bonnet, is displaced from an open state into a closed state by the locking bolt 10 so that the securing hook 200 initially pivots slowly and then quickly according to the curve gradient in order to reduce friction noises until attainment of the closed state of the motor bonnet bolting.

However, in the known solutions, it can generally not be precluded that misuse, i.e. closure of the motor bonnet at excessive closure speed, also leads to yielding of the motor bonnet which can lead to damage to the motor bonnet in principle.

An object of the invention is therefore to provide a further developed locking device for a motor vehicle bonnet.

A locking device according to the main claim solves the object. Advantageous embodiments result from the subclaims. The aforementioned features known from the state of the art can be combined individually or in any combination with one of the objects according to the invention described hereafter.

The object is solved by a locking device for a motor vehicle bonnet, wherein the locking device comprises a locking mechanism with a catch and a pawl for locking the catch in a main latching position. Said locking device also comprises a catch hook which can define an opening movement of a striker after opening of the locking mechanism in a secure position which is between an intended closed position and an intended open position, wherein the catch hook has a barrier and the locking device is of such a configuration that during a closure process at excessive closure speed the closure movement of the striker is defined by the barrier in the intended closed position of the striker, wherein an end position of the locking device exists, in particular an end position of the catch hook in which the striker can only submerge from the intended closed position with an overload.

As the catch hook has a barrier and the locking device is designed such that during a closure process at excessive closure speed the closure movement of the striker in the intended closed position of the striker is defined by the barrier, damage to the motor bonnet can be prevented.

By the provision of an end position of the locking device in which the striker can only submerge from the intended closed position in the case of an overload, pedestrian protection can be implemented at especially low cost, without any or with only a small number of additional components and especially compactly in the locking device.

The combination of the catch hook with the barrier described above and the end position of the locking device described above enables integrated pedestrian protection in which damage to the motor bonnet caused by misuse, in particular during the closure process, can be precluded simultaneously.

In the main ratchet position of the catch, the catch is ratcheted by the pawl so that rotation of the catch to release the accommodated striker can be prevented in principle.

The intended open position generally enables inspection and/or the making accessible of the motor. In the intended open position, the motor bonnet is raised at a distance to the motor vehicle chassis which enables a person to inspect and/or have the motor made accessible to them.

The intended closed position is assumed to operate the motor vehicle. The motor bonnet aligns with the visible external side in the intended closed position with the adjacent motor vehicle chassis.

In the intended closed position on the inside, the motor bonnet generally has a determined distance to the adjacent motor vehicle chassis so that the motor bonnet can move without the locking device via the intended closed position in the direction of the motor vehicle chassis and could open onto the motor vehicle chassis, if necessary.

The securing position generally has a distance from the intended closed position in the direction of the intended open position, i.e. in the direction of an opening movement so that a hand can only be inserted flatly from the outside between the motor bonnet and the motor vehicle chassis. Only flat means that the hand surface is oriented parallel to the motor bonnet and/or a transversely held hand cannot be inserted between the motor bonnet and the motor vehicle chassis.

The striker executes a closure movement starting from the intended open position in the direction of the intended closed position during closure of the motor bonnet, i.e. in the closure movement direction which is marked with an arrow in the figures.

In principle, the closure movement runs along a defined and/or guided movement track, wherein the pivot bearing, in particular the motor bonnet generally acts as such a guide.

An opening movement and a closure movement are opposite movements, i.e. movements into the opposite direction along the same movement track. The opening movement and closure movement are both a relative movement between the striker and the locking device in principle. Because the striker can be attached both to the motor bonnet and also to the motor vehicle chassis adjacent in a closed position or vice versa. The locking device can be attached accordingly both to the motor vehicle chassis or the motor bonnet.

In one embodiment, the locking device is designed such that during a closure process at excessive closure speed the closure movement of the striker is defined by the barrier in the intended closed position of the striker.

Slight wear to the barrier and thus a long lifespan of the locking device can thus be enabled.

During a normal closure process, the motor bonnet is dropped with its dead weight and/or slight manual or automatic additional force from the raised open position and/or accelerated in the closure movement direction. The closure movement of the striker relative to the locking device is decelerated by the impact on the catch hook and its displacement by pivoting and by an opening spring for the motor bonnet as a result of frictional forces and/or the force of the catch hook spring. During impacting of the striker on the catch or accommodation in the catch inlet slot of the catch the closure speed of the striker is only so slight during a normal closure process that preferably until the attainment of the intended closure position of the striker the kinetic energy is absorbed by the opening spring and/or the catch spring. In principle, the catch spring is pre-tensioned in the opening direction of the catch.

In particular, during a normal closure process without excessive closure speed the closure movement of the striker is defined by an opening spring and/or catch spring on the intended closure position.

Limiting in a position means that when the striker attains the position during execution of a movement into a movement direction the movement of the striker is stopped, i.e. limited, in this movement direction.

In the case of the barrier, this limitation of the movement preferably occurs by stops. This applies in particular also for limitation of the opening movement by means of the catch hook on the securing position and/or for limitation of the submersion by a submersion stop on the submersion position.

In the case of a closure process with no excessive closure speed, in which the closure movement of the striker on the intended closure position is limited by the opening spring and/or catch spring, stoppage of the closure movement on the closed position occurs. However, a springing back or temporary yielding of the opening spring and/or the catch spring can occur, in particular in such a way that the catch pivots for a short time beyond the main ratchet position against the force of the opening spring and/or the catch spring, i.e. in an anti-clockwise direction.

However, such pivoting is a maximum of 25°, preferably a maximum of 15°, of particular preference a maximum of 5°. Damage to the motor bonnet can be precluded during such pivoting of the catch.

Such pivoting may preferably not lead to stoppage against a submersion stop. Because during impacting of the striker on the submersion stop during a closure process, damage can occur to the motor bonnet by means of deflection of the motor bonnet.

In particular, during a normal closure process, the striker is defined by the opening spring and/or the catch spring to the closed position in such a way that no damage can occur to the motor bonnet.

Therefore, during a normal closure process, no excessively great closure speed occurs which could damage the motor bonnet. The closure speed always remains below a threshold speed.

During a closure process with excessively great closure speed the threshold speed is exceeded. A reason for this is usually misuse, in which the motor bonnet is shut with excessive force which leads to an excessive closure speed of the striker.

If the striker impacts directly on the locking mechanism at an excessive closure speed—as described above during a normal closure process—the force of the opening spring and/or the catch spring would not be sufficient in order to limit the closure movement of the striker in the intended closed position in such a way that deflection and pivoting of the catch against the force of the catch spring is smaller than 25°, preferably smaller than 15°, particularly preferably smaller than 5°. The striker could also impact against the submersion stop with full force and the motor bonnet would deflect. Damage to the motor bonnet could no longer be precluded in both cases.

In the moment of limiting the closure movement of the striker at excessive closure speed in the intended closure position of the striker by the barrier the locking device is generally not in the end position.

The fact that the striker can only submerge beyond the intended closed position in the case of an overload does not affect the closure process in particular, but preferably only an operating state suitable for driving of the motor vehicle, i.e. if the motor bonnet is closed, the locking mechanism is in the main ratchet position and/or the catch hook is in an end position.

Load means a force which is exerted in the closed position by the striker on the catch in order to pivot the catch against the force of the catch spring, i.e. in an anti-clockwise direction. Load therefore means a force in the direction of submersion.

Overload means a load or force above a threshold load. The resting deadweight of the motor bonnet and/or the force of the pawl spring are not capable of generating an overload.

However, in the case of a pedestrian crash, by means of the weight and the impact of the pedestrian on the motor bonnet an overload, i.e. a load above the threshold load, is transmitted to the striker.

In particular, the threshold load is equal to or greater than the force of the opening spring and/or catch spring—if applicable reduced by the resting weight force of the motor bonnet, i.e. the forces acting on the striker in the main ratchet position and closed position in the direction of the open position which is absorbed by the ratcheted pawl via the lock plate 14 in order to guarantee mechanical equilibrium and thus a uniform position of the striker in the closed position.

Submersion beyond the intended closed position means that the closure movement of the striker continues beyond the intended closed position.

Submersion means a movement of the striker in particular along the movement track starting in the intended closed position. The direction of the submersion movement is opposed to the opening direction. Submersion of the striker means causation of a deflection of the catch 1 beyond the main ratchet position.

As long as the striker does not impact against the submersion stop during submersion, damage to the motor bonnet is precluded in principle.

In particular, the maximum submersion path, preferably at least 15 mm and/or a maximum of 25 mm, along the movement track from the intended closed position to the submersion position is designed in such a way that the motor bonnet is generally not also accelerated adequately during a pedestrian impact in order to cause damage to the motor bonnet even during stoppage of the striker on the submersion stop.

Hereafter, the invention is explained in further detail on the basis of exemplary embodiments illustrated diagrammatically in the figures and in relation to the figures the embodiments and additional advantageous embodiments are described in further detail.

The following are shown:

FIG. 1: Locking device at the start of a closure process

Figure 2:
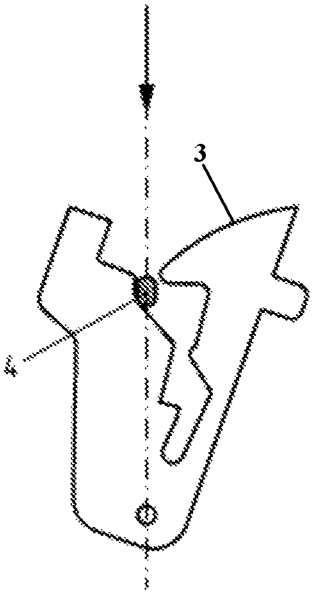

FIG. 2: Locking device during insertion of the striker into the inlet slot

Figure 3:
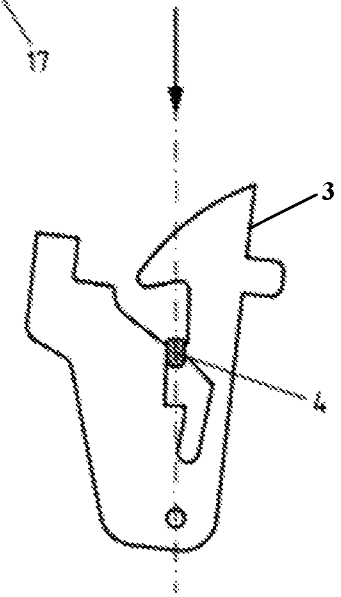

FIG. 3: Locking device by passing of the constriction by the striker

Figure 4:
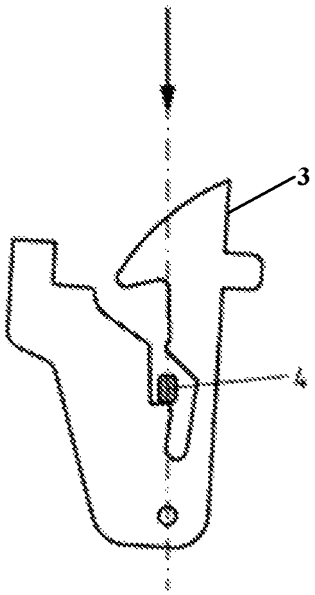

FIG. 4: Locking device during stoppage of a striker with excessive closure speed on the barrier FIG. 5: Locking device in the end position FIG. 6: Locking device with striker submersed by overload FIG. 7: Locking device in end position with superimposed locking mechanism The reference signs in FIG. 1 also apply to all remaining figures and were only superimposed there for the purpose of clarity.

Figure 5:
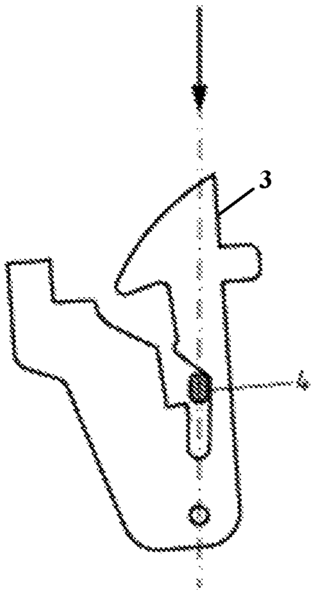
Figure 6:
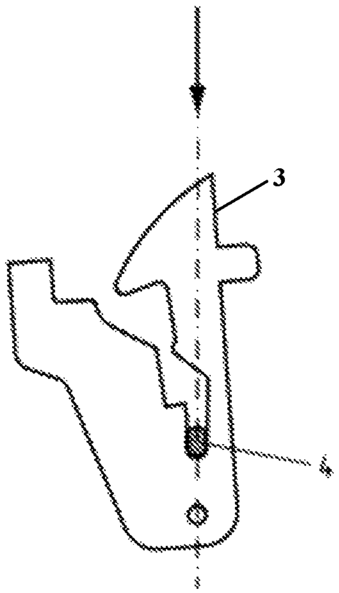
Figure 7:
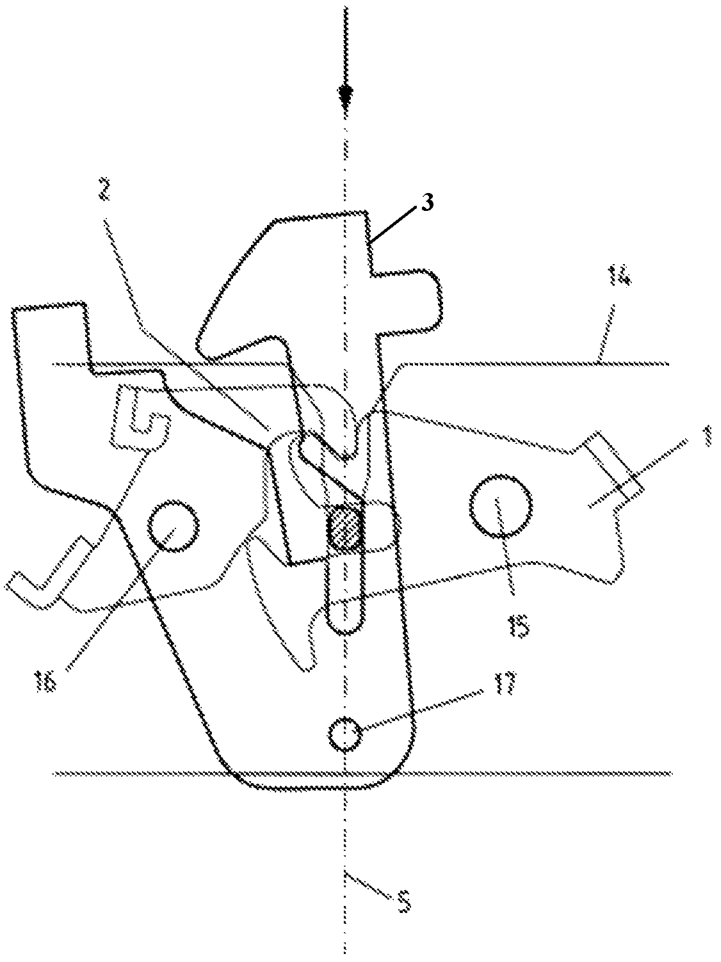

FIGS. 1 to 7 show an exemplary embodiment of a locking device according to the invention. In FIGS. 1 to 6 the catch 1 and the pawl 2 and the lock plate 14 are superimposed. FIG. 7 shows FIG. 5 with a superimposed catch 1 and pawl 2 in the main ratchet position and the lock plate 14, i.e. a plate to attach the catch 1 and the pawl 2, preferably with a lock plate inlet slot for the striker, which is also apparent in FIG. 3.

The catch 1 is pivotably accommodated around the catch axis 15. The catch 1 is pre-tensioned in the clockwise direction in particular by a catch spring which is not illustrated.

The pawl 2 is pivotably accommodated around the pawl axis 16. The pawl 2 is pre-tensioned in the clockwise direction in particular by a pawl spring which is not illustrated.

The catch hook 3 is pivotably accommodated around the catch hook axis 17. The catch hook 3 is pre-tensioned in particular by a catch hook spring which is not illustrated in an anti-clockwise direction.

An opening spring which is also not shown in the figures presses the motor bonnet and thus the striker starting from the closed position in the direction of the open position.

In particular, the catch hook 3 has a hook shape, preferably in the shape of a "1". The upper bevel 13 acts as a pivot as a result of an impacting and gliding striker during a closure movement, as illustrated in FIG. 1.

On the opposite side of the bevel 13 the v-shaped depression acts as a securing stop and/or securing ratchet point for the striker after leaving the locking mechanism.

In particular, the hook shape constitutes one of two legs connected in a U-shape, wherein the inlet slot 19 of the catch hook 3 runs between both legs. Preferably, the trough of the inlet slot 19, i.e. in the area of the base of the legs connected in a U-shape forms a depression 12 for submersion. The submersion is preferably limited by a submersion stop, in particular at the base of the depression.

In one embodiment, the closure movement of the striker 4 is limited with excessive closure speed by stoppage against the barrier 6 and/or the striker 4 is located during stoppage against the barrier 6 in the intended closed position of the striker 4.

The intended closed position is, in the same way as the submersion position, the securing position and the open position a position on the movement track 5 of the striker.

Due to the fact that the striker 4 opens against the barrier 6, the striker 4 is simultaneously brought into the position for ratcheting of the locking mechanism and held there. Damage to the locking mechanism can thus be prevented. Furthermore, only by pivoting of the catch hook 3 can the depression 12 be provided to enable submersion during overload for the striker 4.

In one embodiment, the locking mechanism is located against the barrier 6 during stoppage of the striker 4 and/or in the end position of the locking device in the main ratchet position.

An especially reliable accommodation and holding of the striker 4 can also thus be enabled at an excessive closure speed.

In one embodiment, the catch hook 3 has a catch hook spring which pre-tensions the catch hook 3 in the direction of the end position.

Pre-tensioning in the direction of the end position means that the catch hook spring transmits a torque around the catch hook axis 17 on the catch hook 3 in an anti-clockwise direction.

By adjusting the spring force the threshold speed can thus be impacted in which a striker stops against the barrier. By means of the catch hook spring the depression 12 can also be moved below a striker 4 stopped against the barrier especially quickly and reliably so that the striker 4 can submerge in the case of overload.

In one embodiment, the catch hook 3 has an inlet slot 19 to accommodate the striker 4.

The inlet slot 19 of the catch hook 3 enables implementation of a very compact mechanism to prevent motor bonnet damage as a result of misuse with simultaneous pedestrian safeguarding by means of a submersion option for the striker in the case of overload.

In one embodiment the barrier 6 is a superficial section of the inlet slot 19 or the barrier 6 is connected with the inlet slot 19 in a firmly bonded and/or immobile manner.

A superficial section is generally of a single component design with the inlet slot 19 and/or the catch hook 3, i.e. made from a material piece, i.e. stamped out of a single piece of sheet metal together as a coherent component.

A firmly bonded barrier can be welded, soldered or affixed.

A barrier 6 which is connected in an immobile manner with the inlet slot 19 has no degree of freedom of movement relative to the inlet slot 19. An immobile connection can be produced by an interlocking and/or force-fitting connection, such as a clip connection, for example.

All alternatives to this embodiment have the advantage that a reliable, load-dependent limitation of the closure movement of the striker in the intended closed position can be attained at an excessive closure speed.

In one embodiment, the inlet slot 19 has a depression 12 for submersion of the striker 4 and/or the depression 12 for submersion of the striker 4 is a contour section of the inlet slot 19.

A depression is a means which is especially easy to produce to enable submersion, especially if it is executed as a contour section of the inlet slot 19.

Contour section means a limited surface section of the contour of the inlet slot which was generally made of a single component, e.g. by stamping.

In particular, the depression 12 is U-shaped, wherein one lateral wall forms an edge with the barrier 6 or its surface section, in particular with an angle of at least 80° and/or a maximum of 90°. The other lateral wall is oriented parallel to the movement track 5 in the end position and preferably corresponds to the second lateral wall 9 of the inlet slot 19, so that the striker can submerge in a straight line.

In one embodiment, the barrier 6 and the depression 12 are arranged adjacent to one another and/or are directly adjacent to one another.

This enables a reduced pivoting path of the catch hook 3 to provide the depression for a striker 4 stopped against the barrier.

In one embodiment, the striker 4 lies adjacent on a lateral wall of the inlet slot 19 in the end position of the locking device, in particular on a second lateral wall 9, and the locking mechanism is located in the main ratchet position.

The end position can thus be defined by a striker 4 which is ratcheted by the locking mechanism located in the main ratchet and is depressed against the lateral wall by the catch hook spring.

A barrier-free submersion in the case of overload can thus be guaranteed.

In one embodiment, the inlet slot 19 has a constriction 7 for a custom-fit opening of the striker 4.

Custom-fit opening means that the constriction 7 provides a passage for the striker 4, the size of which corresponds to the size of the striker plus a clearance fit so that the striker 4 passes through the passage with an allowance.

By means of the constriction 7 the catch hook 3 is pivoted into a defined rotational position during passage of the striker 4.

This enables the threshold speed to be determined by setting the force of the catch hook spring, of the distance between the constriction 7 and the barrier 6 and/or the breadth of the barrier 6 transversely to the movement track 5 in this position of the catch hook 3.

In one embodiment, the closure movement of the striker 4 occurs along a defined movement track 5, wherein the movement track 5 intersects the barrier 6 and/or a catch hook axis 17 of the catch hook 3 if the striker 4 is located in the constriction 7.

Intersecting the movement track 5 means intersecting a straight line along the movement track 5 or a movement track 5 without any barriers or stops.

As the movement track 5 intersects the barrier 6 and/or an catch hook axis 17 of the catch hook 3, if the striker 4 is located in the constriction 7, the energy of the stoppage of the striker 4 can be accommodated in the case of excessive closure speed against the barrier 6 by the catch hook spring 17 without inducing a torque into the catch hook 3 and thus to pivot this.

In one embodiment, the locking device is designed such that after the striker 4 has passed the constriction 7 during a closure process, the catch hook spring pivots the catch hook 3 in the direction of the end position.

This enables both provision of the depression 12 to submerge below a striker stopping against the barrier 6 and also limitation of the closure movement of a striker below the speed threshold by the locking mechanism.

In one embodiment, the locking device is designed such that during a closure process, in particular after passing of the constriction 7 a striker 4 quickly reaches the barrier 6 with excessive closure speed, in particular therefore overcomes a path between the constriction 7 and the barrier 6 than the catch hook 3 can pivot into the end position.

Effective protection of the motor bonnet can thus be enabled before damage as a result of misuse during the closure process.

In one embodiment, the locking device is designed such that during a closure process, in particular after passing the constriction 7, a striker 4 at normal closure speed stops by means of pivoting of the catch hook 3 into the end position before reaching the intended closed position of the striker 4 against the lateral wall of the inlet slot, in particular the second lateral wall 9 and/or the closure movement on the closed position is limited above the depression 12 in particular by means of a force of an opening spring and/or a catch spring.

The opening spring lifts the striker 4 in an opposite direction to the submersion movement.

A locking device which is designed such that during a closure process only at excessive closure speed the closure movement of the striker 4 is limited by the barrier 6 in the intended closed position of the striker 4 can thus be enabled.

In one embodiment, the barrier 6 is designed such that the barrier 6 does not plastically deform systematically.

In one embodiment, the locking device is designed such that the closure movement of the striker 4 is defined in the case of overload on a submersion position by a submersion stop 10 of the catch hook 3.

Additional components can be saved by means of the submersion stop 10 integrated in the catch hook. In addition, the submersion stop 10 enables a reproducible submersion with a defined submersion path. Damage to the motor bonnet by collision with the adjacent vehicle chassis can thus be prevented.

In a further embodiment, the barrier is integrated in the catch hook in order to attain the aforementioned advantages.

The submersion path, i.e. the distance between the submersion position and the intended closed position is at least 10 mm, preferably 14 mm, and/or a maximum of 20 mm, preferably a maximum of 16 mm. Effective pedestrian protection can thus be attained.

In principle, the inlet of the inlet slot 19 is on the opposite side from the submersion stop 10 and/or the catch hook rotational axis 17. Because the striker can reach into the inlet slot 19 during the closure movement by pivoting of the catch hook 3 which is described in greater detail hereafter.

In one embodiment, a first lateral wall 8 and/or a second lateral wall 9 of the inlet slot 19 are intended. The inlet of the inlet slot 19 preferably runs in a triangular shape, preferably with an accommodation bevel 18, wherein only one of the two lateral walls, in particular the first lateral wall 8, extends at an angle in the direction of the barrier 6 to produce the triangular shape.

In one embodiment, the first lateral wall 8 in an area adjacent to the barrier 6 forms an L-shape together with the barrier 6.

In particular, the barrier is at least as long as the striker 4 is wide and/or a maximum of twice as long as the striker 4 is wide.

In one embodiment, only one barrier 6 is intended, wherein an especially simple mechanism can be attained.

In particular, the locking mechanism is designed such that the pawl 2 during overload and submersion of the striker 4 despite pivoting of the catch 1 remains or is held in its position, e.g. by a holding means so that the catch 1 ratchets again with the pawl 2 during pivoting back.

Alternatively, joint rotation of the pawl 2 with the catch 1 pivoting as a result of submersion of the striker 4 can be intended with maintenance of the ratcheting.

Hereafter, an opening process and a closure process and submersion during a pedestrian accident is described as an example hereafter.

Normally, a triggering lever is provided for on the motor vehicle chassis which can be triggered by means of a Bowden cable or similar which is covered by the motor bonnet, which can detach the pawl from the ratcheted position with the catch located in the main ratchet position.

During operation of the triggering lever for opening of the locking device and thus the motor bonnet the striker 4 which is preferably attached on the underside of the motor bonnet is released. In addition, the motor bonnet or the striker is displaced by an opening spring from the triggered locking mechanism in the direction of the open position. This opening movement is initially limited by the securing stop 11 of the catch hook 3.

The user can now reach under the motor bonnet with the flat hand in order to operate a pivoting lever for the catch hook 3 which pivots the catch hook 3 against the catch hook spring force in a clockwise direction so that the striker 4 is no longer limited by the securing stop 11 in the movement track 5, at least as long as the catch hook 3 remains pivoted against the catch hook spring force.

The opening spring presses the striker 4 only slightly in the direction of the intended open position, straight enough so that after release of the catch hook 3 the striker 4 is hindered by the external bevel 13 of the catch hook 3 back into the securing position defined by the securing stop 11.

The user can now lift the motor bonnet automatically to the intended open position or the lifting occurs automatically. In particular, the intended open position is defined by a stopper or holding mechanism which enables the user sufficient space for convenient access and simple inspection of the motor.

To close, the user will detach the holding mechanism in the intended open position and the motor bonnet will either fall itself due to gravity in the direction of the motor vehicle chassis and/or also regain a commutated force by the user.

As FIG. 1 shows, the striker 4 impacts on the upper bevel 13 during falling or pivoting of the motor bonnet and continues its closure movement along the movement track 5 with displacement of the catch hook 3 in the clockwise direction.

As FIG. 2 shows, the striker 4 impacts on the accommodation bevel 18 by means of the pivoted position of the catch hook 3 and continues its closure movement along the movement track 5 with displacement of the catch hook 3 in an anti-clockwise direction.

As FIG. 3 shows, the catch hook 3 assumes a defined position when it passes the constriction 7 by means of the striker 4.

FIG. 4 shows the case of a striker 4 with an excessive closure speed. Because the striker 4 reaches the barrier 6 before the catch hook 3 could pivot into the end position by the catch hook spring in an anti-clockwise direction.

With the stoppage against the barrier 6 the locking mechanism ratchets analogously to FIG. 7. The catch hook 3 can thus continue its pivoting movement into the end position until the striker stops laterally against the second lateral wall 9 of the inlet slot, as shown in FIG. 5.

However, FIG. 5 also relates to the embodiment in which a striker 4 at normal closure speed, i.e. no excessive closure speed, reaches the locking mechanism more slowly or simultaneously with the pivoting of the catch hook 3 into the end position and ratchets in the intended closure position by the locking mechanism there.

In both cases, i.e. with and without excessive closure speed, the locking device is thus located in the end position which enables submersion in the case of overload.

In the case of a pedestrian collision, therefore, in both cases equally the striker will overcome and submerge the force of the opening spring and catch spring as a result of overload. The submersion can occur as a maximum to the submersion stop on the stop position. However, this submersion path is generally sufficient to reduce the severity of injury of the pedestrian as a result of the accident by submersion of the striker 4.

In particular, the depression 12 is molded in parallel or mirror-symmetrically to the movement track 5 in the end position of the locking device or a path between the catch hook axis 17 and the securing stop 11 during stoppage of the striker 4 against the barrier 6.

In particular, a straight line formed by the movement track 5 runs in the end position by the catch hook axis 17.

The invention claimed is:

1. A locking device for a motor vehicle bonnet, the locking device comprising:
- a locking mechanism with a catch and a pawl for locking the catch in a main latching position;
- a striker that is moveable between an intended closed position and an intended open position; and
- a catch hook which defines an opening movement and a closure movement of the striker, wherein the catch hook further defines a securing position for the striker which is between the intended closed position and the intended open position, wherein the catch hook has a barrier,
- wherein during a closure process at excessive closure speed, the closure movement of the striker is defined by the barrier when the striker moves into the intended closed position of the striker,
- wherein the striker is configured to move to a submerged position that is past the intended closed position in a direction of the closure movement in response to an overload force, and
- wherein the catch hook has an inlet slot to accommodate the striker, wherein the inlet slot has a constriction for custom-fit passage of the striker, and wherein the constriction is arranged in the inlet slot between an inlet of the inlet slot and the barrier,
- wherein the striker engages multiple surfaces in the catch hook in sequence as the striker moves from the intended open position to the intended closed position, wherein the multiple surfaces include in sequence an upper bevel, an accommodation bevel, the constriction, the barrier, and a lateral wall of the inlet slot.

2. The locking device according to claim 1, wherein a limitation of the closure movement of the striker occurs during the excessive closure speed by stoppage against the barrier, wherein the striker is located in the intended closed position of the striker during stoppage against the barrier.

3. The locking device according to claim 1, wherein during stoppage of the striker against the barrier, the locking device is in an end position and the locking mechanism is located in the main latching position.

4. The locking device according to claim 3, wherein the catch hook has a catch hook spring which pre-tensions the catch hook in a direction of the end position.

5. The locking device according to claim 1, wherein the barrier is a superficial section of the inlet slot or the barrier is connected to the inlet slot in a firmly bonded or immobile manner.

6. The locking device according claim 1, wherein the inlet slot comprises a depression for submersion of the striker and/or the depression for submersion of the striker is a contour section of the inlet slot.

7. The locking device according to claim 6, wherein the barrier and the depression are arranged adjacent to one another and/or are directly adjacent to one another.

8. The locking device according claim 1, wherein in an end position of the locking device, the striker lies adjacent on a lateral wall of the inlet slot and the locking mechanism is located in the main latching position.

9. The locking device according to claim 1, wherein the closure movement of the striker occurs along a defined movement track, and wherein the movement track intersects the barrier and/or a catch hook axis of the catch hook, if the striker is located in the constriction.

10. The locking device according to claim 1, wherein after the striker has passed the constriction during the closure process, a catch hook spring pivots the catch hook in the direction of an end position.

11. The locking device according to claim 1, wherein during the closure process, after passing of the constriction, the striker reaches the barrier more quickly with excessive closure speed than the catch hook can pivot into an end position, and therefore overcomes a path between the constriction and the barrier.

12. The locking device according to claim 1, wherein during the closure process after passing the constriction, the striker, at a normal closure speed, stops by pivoting of the catch hook into an end position before reaching the intended closed position of the striker against a lateral wall of the inlet slot, and the closure movement is defined above a depression by a force of an opening spring and/or a catch spring.

13. The locking device according to claim 1, wherein the barrier is at least as long as the striker is wide.

14. The locking device according to claim 1, wherein the barrier is rigid and non-deformable.

15. The locking device according to claim 1, wherein the securing position has a distance from the intended closed position in a direction of the intended open position.

16. The locking device according to claim 1, wherein the catch is configured to deflect past the main latching position in response to movement of the striker into the submerged position.

17. The locking device according to claim 1, wherein the upper bevel is configured to cause the catch hook to pivot in response to the striker during the closure movement.

18. The locking device according to claim 1, wherein the barrier is located within the inlet slot.

* * * * *